Dec. 27, 1960 J. W. BRADBURY 2,966,261
TEMPERATURE SENSING DEVICE
Filed July 25, 1958 4 Sheets-Sheet 1
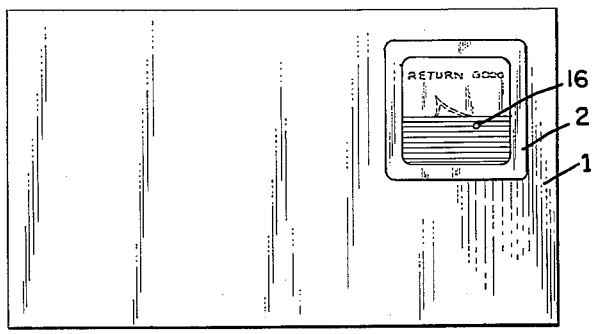
FIG.-1
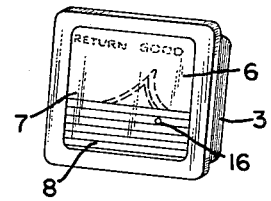
FIG.-2
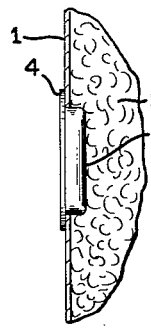
FIG.-3
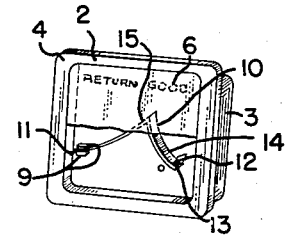
FIG.-4
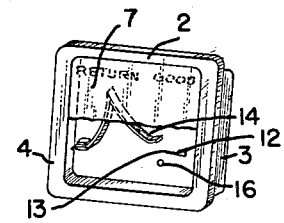
FIG.-5
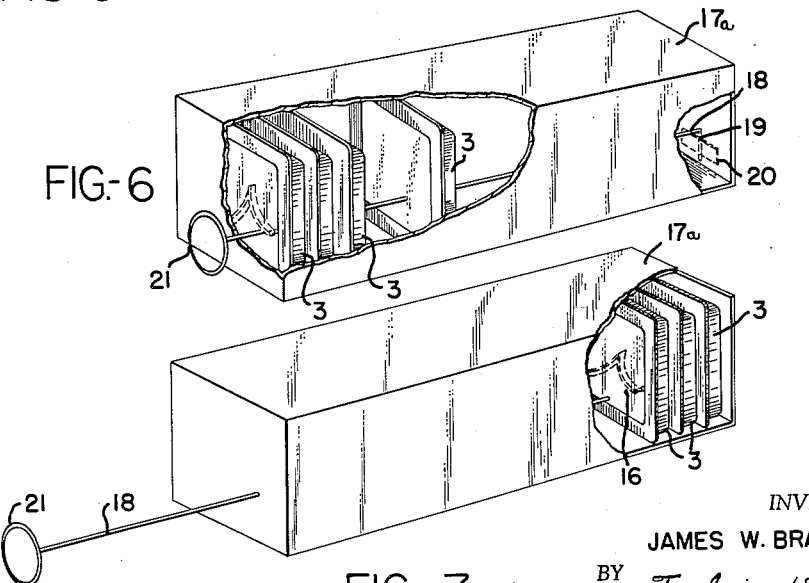
FIG.-6
FIG.-7
INVENTOR.
JAMES W. BRADBURY
BY Toulmin & Toulmin
ATTORNEYS Dec. 27, 1960  J. W. BRADBURY  2,966,261
TEMPERATURE SENSING DEVICE
Filed July 25, 1958  4 Sheets-Sheet 2

INVENTOR.
JAMES W. BRADBURY
BY
Toulmin & Toulmin
ATTORNEYS

INVENTOR.
JAMES W. BRADBURY
BY
Toulmin & Toulmin
ATTORNEYS

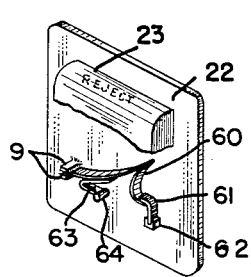
FIG.-21
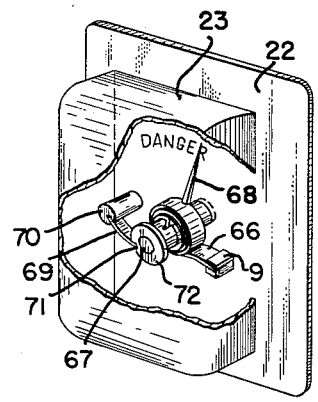
FIG.-22
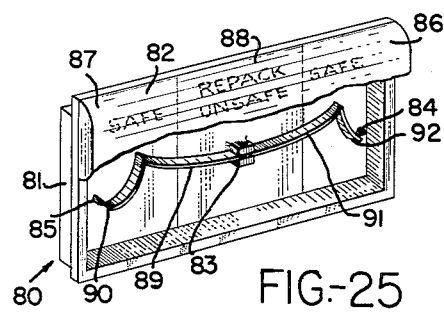
FIG.-25
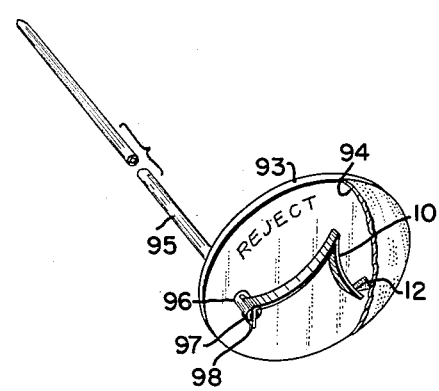
FIG.-26
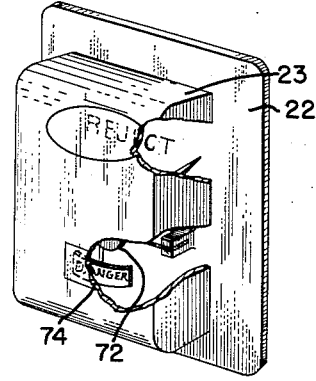
FIG.-23
FIG.-24
INVENTOR.
JAMES W. BRADBURY
BY Toulmin & Toulmin
ATTORNEYS United States Patent Office 2,966,261
Patented Dec. 27, 1960

2,966,261

TEMPERATURE SENSING DEVICE

James W. Bradbury, 220 N. Greenmount Ave., Springfield, Ohio

Filed July 25, 1958, Ser. No. 751,029

18 Claims. (Cl. 206—65)

This invention relates to a visual temperature condition indicator in the nature of a thermic tell-tale, which is mechanical in operation, and has particularly utility in the detection of temperature change of stored and packaged materials, such as frozen food products, photographic materials including film, blood plasma, pharmaceuticals, chemicals and the like.

Many materials in storage and shipment are frequently inadvertently subjected to temperature changes which tend to render the materials non-useful for their intended purpose. For example, frozen food products in the course of shipment may thaw; it is desirable to indicate that such a destructive condition has occurred and to provide a record of the occurrence of the condition in order to permit of appropriate disposal of the goods. Further such an indicator has utility in providing information as to the locale of the conditions which cause the temperature change. Thus, examinations of the indicator associated with the goods at periodic intervals, as the goods pass from manufacturer to consumer, tend to isolate the handling factor which caused the temperature change. Also a dealer upon receipt and inspection of goods delivered by a shipper, may find that the temperature condition indicator shows that the goods have been subjected to improper temperature conditions, and may refuse the delivery. Further a dealer may periodically check the condition of the goods by a glance at the indicator.

Thermic tell-tales of a chemical and similar nature have been suggested but have met with only very limited acceptance and are not utilized to any extent in many fields, as frozen food packaging. Frozen food, however, is particularly subject to destruction for its intended use by a temperature rise of 12–14° F. and destruction in shipping and handling is a frequent occurrence, resulting in the loss of many thousands of dollars per month. It is highly desirable therefore to provide this industry with a temperature condition indicator of tamper-proof characteristics, which is economical to manufacture, rigid and simplified in construction. Utility for such devices exists also in the chemical and pharmaceutical fields where too low a temperature results in destruction of colloids, dispersions and the like.

This invention contemplates the provision of a temperature condition indicator of a mechanical nature which embodies the required characteristics of resistance to shock, sensitivity at a selected range, economy of manufacture, relatively few and simple component parts, and adaptability for sensing a temperature rise or fall by slight modification of assembly procedure.

A basic object of the invention is to provide a novel combination of a temperature condition indicator and a packaged material.

A primary object of the present invention is to provide a temperature condition indicator which is of small size and weight so that it may readily be associated with goods in many types of containers, such as cartons, boxes, envelopes, or any mode of packaging or storing goods wherein sensing a temperature condition of the goods is a factor.

A further object of the invention is to provide a temperature condition indicator the action of which involves no contamination of the goods with which it is associated.

An important object of the invention is to provide in a temperature condition indicator a temperature sensitive device having a snap-action response when a pre-determined temperature condition is attained. Such device is pre-set and includes a spring-loaded signal component and a keeper component, one of the components being a bimetallic element which flexes to effect release of the spring-loaded signal component. The bimetallic element is characterized by the property of differential elongation with temperature change to provide for the flexure and is preferably so retained that flexure upon temperature change in one direction effects the release of the components, while temperature change in an opposite direction tends to increase the retaining force between the keeper and signal components. Further, the spring-loaded component is so retained that upon release it is directed toward a zone which is visually indicative of the condition sensed.

Another object of the invention is to provide a novel arrangement for retaining the temperature condition indicator inactive prior to application of the indicator to the packaged goods; this permits shipping of the indicators in a facile manner.

A particular object of the invention is to provide a novel temperature sensitive device comprising a bimetallic which is formed with an integral keeper and spring-loaded signal component.

Still another object of the invention is to provide a temperature sensitive device which may be packaged with goods to serve as an indicator and which may also serve as an indicator in the heating or cooling of the material.

Yet another object of the invention is to provide a temperature sensitive device having a dual response whereby the attainment of successive temperature conditions may be indicated.

A very important object of the invention is to provide a temperature condition indicator having a temperature sensitive device the time response of which may be controlled in a facile manner.

A principal object of the invention is to provide a temperature condition indicator which may be so combined with a package of frozen food, for example, that the indicator itself may not be removed from the package without leaving evidence of the removal.

The invention has also for an object the provision of novel methods for the formation of the temperature condition indicators and for the arrangement of the indicators for storage and shipping.

A preferred embodiment of the temperature condition indicator comprises a sealed housing in which the temperature sensitive device is located. The housing inhibits tampering with the temperature sensitive device and precludes re-setting of the device. The device incorporates a keeper component which is suitably a sear or protrusion of a base of the housing. A spring-loaded signal component, in the preferred embodiment, is comprised of a relatively short strip of a bimetallic which is formed to provide an indicating portion. The bimetal has a free end portion which engages the sear and is retained thereby against movement in one direction relative to the housing base, the bimetal being stressed against its own spring tension. For this latter purpose, and for providing for flexure of the free end portion, the bimetal is retained by the housing base remote from the free end portion.

The housing is zoned to provide the pre-set temperature sensitive device initially in one locality; when actuated the signal member projects into a zone of the housing which is representative of the temperature condition to be sensed by the device. Such a zone may, for example, be provided with a marking, as "reject."

In connection with frozen food products wherein the temperature to be sensed is about 32° F. the bimetallic is designed to flex in this temperature range to free itself of the keeper; the bimetallic having been stressed against its own tension, then projects itself into the zone representing the temperature condition. With frozen food products the usual temperature maintained is about 18° F. and accordingly a temperature rise is sensed by the bimetallic. However, by merely reversing the metals of the bimetallic in assembly a temperature drop could be sensed if so desired.

The bimetallic may be readily selected to be sensitive to cause flexure at the critical range for substantially any application. Further since the signal member is pre-tensioned the signal member cannot of itself return to the preset position. Also the signal member and the keeper component though small and sensitive form a sturdy organization and resist accidental disengagement due to mechanical shock and the like in handling.

Securing the temperature sensitive device in thermal conductive relation with the packaged material is effected in many ways. The housing of the indicator may be formed to be sealed to a carton, to project outwardly or inwardly of the carton, or the temperature sensitive device may lie in contact with the material.

For the purpose of facilitating handling of the sealed, pre-set temperature devices at normal temperatures a length of a retainer may be secured in engagement with the bimetallic and the retainer so arranged that it may be withdrawn from the bimetallic under conditions under which the bimetallic remains set. Thus for frozen food temperature indicators, the indicators may be pre-set in a cold room, the length of retainer extended through the housings and in contact with the bimetallics to retain the bimetallics—and then the combination may be transported at normal atmospheric conditions. To utilize a bimetallic so shipped the retainer is withdrawn from the indicators in a cold room and applied to the frozen food in the room.

The arrangements of the indicators may be formed to be extremely sensitive and to operate at high as well as at extremely low temperatures. For example, a change of only one or two degrees may be readily sensed, and temperatures as low as −60° F. may be sensed with commercially available bimetallics.

Further, in the preferred embodiment the movement of the indicator is amplified, as will be noted more particularly hereinafter.

The invention will be more fully understood by reference to the following detailed description and accompanying drawings wherein:

Figure 1 is a front view of a frozen food package with a temperature condition indicator of the invention applied to the package;

Figure 2 is a perspective view of the temperature condition indicator of Figure 1 and in substantially full size;

Figure 3 is a fragmentary side elevational view illustrating the indicator of Figure 1 in combination with a package;

Figure 4 is a perspective view of the temperature condition indicator of Figures 1 and 3 with parts broken away illustrating the pre-set position of the indicator;

Figure 5 is a view similar to that of Figure 4 but illustrating the indicator in an actuated position;

Figure 6 is a view with parts broken away illustrating a plurality of temperature condition indicators assembled in a carton and ready for shipment;

Figure 7 is a view with parts broken away illustrating a step in the unpackaging of the temperature condition indicators;

Figure 21 illustrates in perspective a further modification of the temperature condition indicator of invention;

Figure 22 is a somewhat enlarged view illustrating another modification of the temperature condition indicator;

Figure 23 is a perspective view with parts broken away illustrating a modified device similar to that of the structure of Figure 22;

Figure 24 illustrates yet another embodiment of the invention;

Figure 25 illustrates a dual unit constructed in accordance with the invention; and Figure 26 illustrates a novel probe combined with the temperature condition indicator of invention.

Throughout the drawings similar numerals, where practicable, have been utilized to designate corresponding parts.

Figure 8:
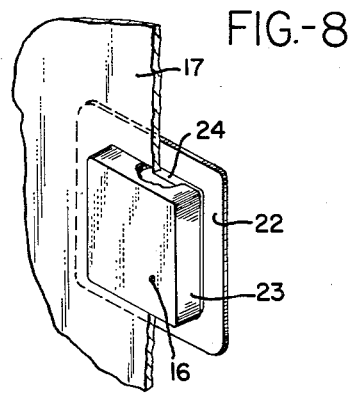
Figure 8 is a perspective view with parts broken away illustrating the combination of a temperature condition indicator with a carton, the indicator being snap-fitted to the carton.

Referring now to the drawings and particularly first to Figures 1–5, inclusive, the numeral 1 designates a package of frozen food, for example. Such packages in the frozen condition normally have a temperature of about 17–18° F. and are maintained under this temperature condition to preserve the food. In the course of shipping such packages are sometimes subjected inadvertently to temperature conditions which may cause thawing. This necessitates, in many instances, rejecting a shipment. The package of Figure 1 is provided with a temperature condition indicator of invention, which is indicated at 2. This indicator 2 has a base 3 of somewhat cup-shaped and a flanged closure 4 sealed to the base 3. As illustrated in Figure 3 the base in this instance is in direct contact with the material 5 of the frozen food package 1.

The indicator, as clearly illustrated in Figures 2, 4 and 5, is provided on the base with zones 6, 7, 8. Zone 6 is marked "good" denoting that the package to which the indicator is applied has not been subjected to thawing. Zone 7 is designated "return" to indicate a reject condition of the goods occasioned by thawing. Suitably the closure 4 is transparent in the areas of zones 6 and 7, and may be transparent or opaque in the area of zone 8.

The temperature condition indicator 2 (Figures 4 and 5) is provided on the base 3 with a pair of molded studs 9, preferably formed integral with the base. These studs are in closely spaced relation and form a retainer for a signal component 10 having an extremity 11. The extremity 11 is fitted in tight frictional engagement between the studs 9 and the extremity is bent downwardly, as illustrated in Figure 4, to securely retain the bimetallic strip.

The base 3 has molded thereon a keeper component 12 in the form of a sear having a forward edge 13 which is knife-like. The free end 14 of the bimetallic 10, as shown in Figures 4 and 5, engage with the keeper component 12. The bimetallic strip 10 is itself stressed under its own spring tension into engagement with the keeper component. Also the bimetallic strip is reversely bent upon itself to provide a signal flag 15 which as shown in Figure 4 projects into the zone 6. This not only provides a convenient signal flag but contributes considerable rigidity to the structure due to the generally triangular formation, and hence the structure is resistant to mechanical shock.

It is to be noted that the retainer 9 and the keeper component 12 are in closely spaced relation and that the retainer is so positioned as to cause the spring-loaded signal component to project into the zone 7, marked "return" when the temperature condition indicator is actuated.

Further the retainer 9 serves as a pivot about which the spring-loaded signal component or bimetallic swings, and accordingly a considerable amplification of movement is achieved. This is occasioned because the movement of the free end portion 14 of the bimetallic need only move very slightly in order to provide a very considerable movement of the signal flag 15.

By way of example, and considering the indicator to be applied to the frozen food package 1, as the temperature rose to about 32–33° F., the free end portion 14 of the bimetallic bends downwardly to free itself of the the bimetallic snaps upwardly to indicate the "return" keeper component, and then, due to the spring loading, condition of the goods. The bimetallic for this latter purpose, that is, for sensing rise in temperature, will be provided, as noted more clearly hereinafter, with the high expansion metal on the upper side, the low expansion metal on the lower side. While any suitable combination of metals may be employed, brass and steel are useful for the purpose as the bimetallic.

It will be noted from Figures 1–5, inclusive, that the closure 4 has an opening 16 clearly shown, and the base 3 which, together with the closure 4, forms the housing, is similarly provided with an aperture 16 in alignment with the aperture of the closure. This aperture lies beneath the free end portion 14 of the spring-loaded signal component 10, and is for the purpose of facilitating packaging and shipping of the temperature condition indicator devices themselves. Thus, in assembling the temperature indicator devices of Figures 1–5, inclusive, the bimetallic or spring-loaded signal component 10 is fitted into position in a cold room, wherein the temperature is sufficiently low that the bimetallic will not be actuated.

A plurality of the assembled indicators is then packaged in a carton 17a (Figure 6) and a wire 18 is extended through the aligned openings of the temperature condition indicator housings by passing the wire through the aligned openings 16. The wire 18 then lies in abutment, as is clearly shown in Figure 6, with the lower side of the bimetallic strip and retains the bimetallic strip in engagement with the keeper component. Conveniently the wire 18 is bent downwardly at 19 and secured to the outer side of the carton 17a with a removable tape 20.

The forward end of the wire 18 is provided with a finger ring 21; for the purpose of shipping of the indicators in their loaded condition the structure of Figure 6 is fully adequate despite temperature rise in the shipping procedure. Upon arrival at destination, where the indicators are to be attached to frozen foods, for example, the indicators are placed in a cold room in the carton until brought down to temperatures at which they are to be affixed to the goods. Thereupon the strip 20 is removed, the bent-over portion of the wire 19 is straightened, and the wire 18 is withdrawn by pulling on the finger ring 21. The spring-loaded signal component is retained in its preset condition and the indicator device is ready for use. It is important that the indicator devices in many instances be so provided on the carton that the removal of the indicator device would, without detection, be difficult. While not necessary, in many instances, if so desired, the apertures 16 may be sealed with a drop of wax prior to utilization of the indicators.

As illustrated in Figure 8 a temperature condition indicator provided on a carton 17 has a base 22 in the form of a panel in the nature of a flat piece of material as plastic. It is provided with a closure 23 of cup-shape. The closure 23 has a recessed periphery 24 which engages the carton 17, the device being force-fit through an opening of the carton. Removal of such a device from the carton 17 would, of course, leave the opening, which would be clearly indicative of tampering with the combination of the frozen food package and indicator.

Figure 9:
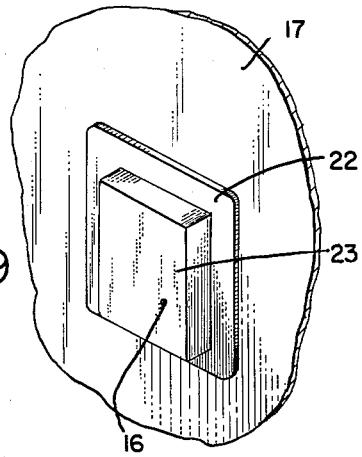
Figure 9 is a perspective view illustrating a temperature condition indicator adhered to the side of a carton.

Carton 17 of Figure 9 has a temperature indicator device provided with a base 22 like that of Figure 8 in the form of a panel and a closure of cup-shape designated by the numeral 23. In this instance the temperature condition indicator is sealed to the carton as with adhesive, which renders removal of the indicator without detection virtually impossible.

Figure 10:
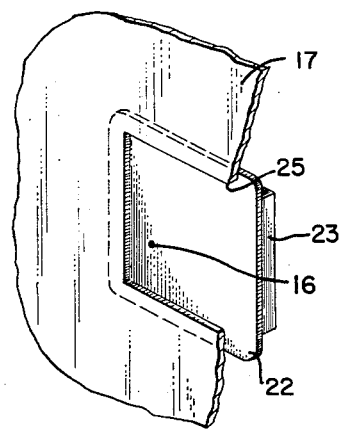
Figure 10 is a perspective view as from the inside carton taken from the rear illustrating a further structural arrangement of the combination of a carton with a temperature condition indicator.

In Figure 10 the indicator having the flat panel 22 and the closure 23 is indicated as being sealed over an opening 25 of the carton 17. In this case obviously removal of the indicator would clearly indicate the opening.

Figure 11:
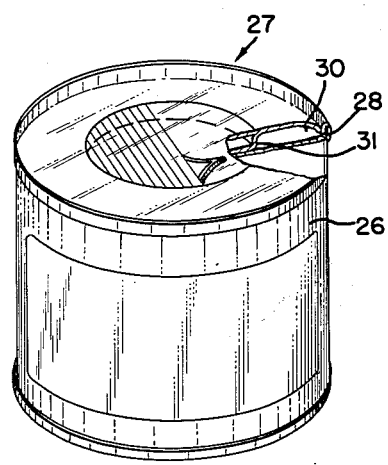
Figure 11 is a perspective view with parts broken away illustrating a temperature condition indicator secured on a container in the form of a can.
Figure 12:
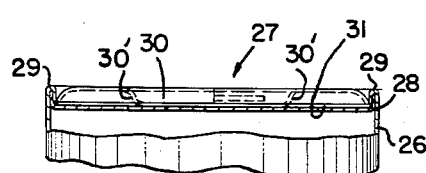
Figure 12 is a fragmentary view partially in section illustrating a temperature condition indicator snap fitted in position on a can top.

Figure 11 illustrates a container in the form of a can 26 provided with a temperature condition indicator generally designated at 27. In this instance, as shown in Figures 11 and 12, the lid 28 of the can is upturned at its periphery and the can 26 is inturned at the periphery at 29 to receive the upturned portion of the can top 28. The temperature condition indicator 27 is force-fit onto the cap top 28 against the inturned periphery 29. The indicator itself internally is similar to that already described, but is provided with a closure 30 which force-fits with the inturned portion 29 of the cam 26. Also, in this instance the base 31 of the temperature condition indicator is depressed centrally to provide for thermal contact with the can top 28.

Figure 13:
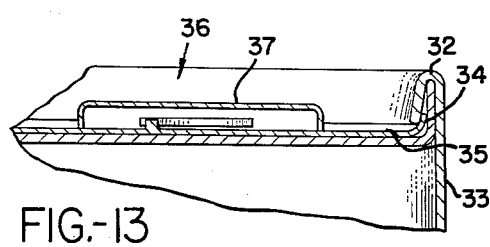
Figure 13 is a view similar to that of Figure 12 but illustrating a further arrangement for fitting a temperature condition indicator into a can.

Figure 13 illustrates a modification of the structure of the temperature condition indicator in combination with a can, wherein an inturned portion 32 of can 33 receives an upturned lip 34 of a base 35 of a temperature condition indicator designated generally at 36 and having a closure 37.

Figure 14:
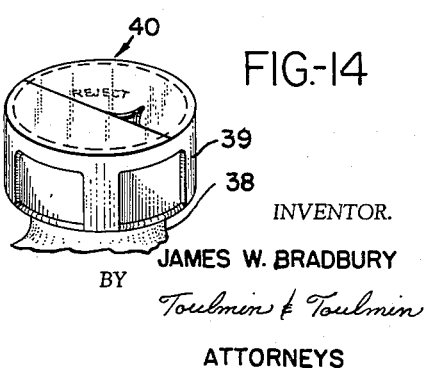
Figure 14 illustrates the combination of a temperature condition indicator with a bottle cap.

Figure 14 illustrates a further modification in which a bottle 38 having a cap 39 is provided with a temperature condition indicator generally designated at 40.

Figure 15:
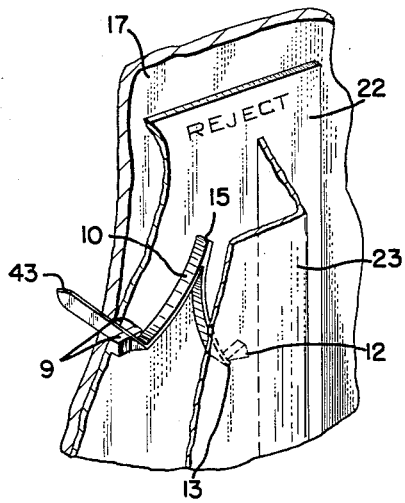
Figure 15 is an enlarged and fragmentary view partially in section illustrating a temperature condition indicator similar to that of Figures 1–5, inclusive, but having an integral probe.

Referring now to Figure 15 the carton 17 is provided with a temperature condition indicator having a base like that of Figures 8–10, inclusive, and designated by the numeral 22, the closure for the base being indicated by the numeral 23. In this instance the spring-loaded signal component, in the form of a bimetallic 10, has an extension 43 which projects beyond the retainer 9 rearwardly and serves as a probe. Otherwise the structure set forth in Figure 15 is similar to that set forth in Figures 1–5, inclusive, with respect to the temperature condition indicator, and the numerals designate the corresponding parts.

Figure 16:
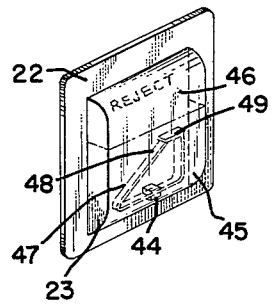
Figure 16 is a perspective view showing a temperature condition indicator having another form of temperature sensing device—the device of Figure 16 being shown in a pre-set position.
Figure 17:
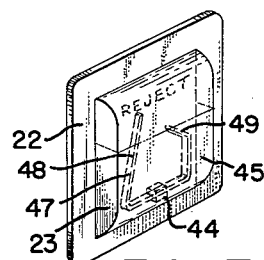
Figure 17 is a view similar to that of Figure 16, but with the device in an actuated position.

Figures 16 and 17 illustrate a modification in which the keeper component and the spring-loaded signal component are formed integral and in a bimetallic strip. Thus, as illustrated in Figure 16, within the housing formed by the base 22 and the closure 23 there is supported on the base a retainer 44 positioned somewhat centrally of the base in the zone 45. Below a visible zone 46, designated "reject" the retainer 44 engages the bimetallic 47 along the lower length of the bimetallic and at the extremity of a spring-loaded signal component 48. The keeper component is formed by an opposite end 49 of the bimetallic 47 and is bent over to engage with the spring-loaded component 48 and to retain the same.

As illustrated in Figure 17 upon release of the components the spring-loaded component 48 snaps upwardly to the reject position. This is occasioned when the keeper component 49 bends upwardly under the influence of a temperature change. In the instance where a rise in temperature is to be sensed, as in the case of frozen food, for example—the high expansion metallic would be on the upper side and the low expansion on the lower side in the structure of Figure 16.

It is to be noted particularly that it is not possible with the spring-loaded signal component to return to its original position simply by virtue of change in temperature, because the keeper component 49 would bend downwardly preventing the signal component from again passing into locking engagement. The device could, of course, be utilized to sense low temperatures by reversing the bimetallics.

Figure 18:
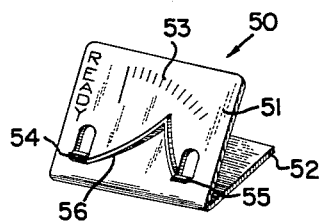
Figure 18 illustrates a further modification of a temperature condition indicator.

The structure of Figure 18 is particularly adapted for incorporation in packages of "ready to bake" materials, such as rolls, buns, icebox cookies, and so forth. To this end the temperature condition indicator designated generally by the numeral 50 has a base 51 provided with a rearwardly bent portion 52. The base has a scale 53 and the retainer 54 and keeper component 55 are cutouts of the base, which is preferably of aluminum metal. The spring-loaded signal component is in this instance designated by the numeral 56 and would be released from the keeper component by a rise in temperature while in the packaging of the goods to be baked. Since many such packages have a transparent envelope, the temperature condition indicator would be positioned to be viewed. Additionally the temperature condition indicator of the construction shown in Figure 18 could be provided in a package of the goods to be baked and assembled with a bimetallic as at 56 of such properties that the bimetallic would only respond to a very considerable rise in temperature, for example, in the temperature at which the goods are to be baked. In this instance the indicator would be used in the oven to indicate the temperature attained by the oven.

Figure 19:
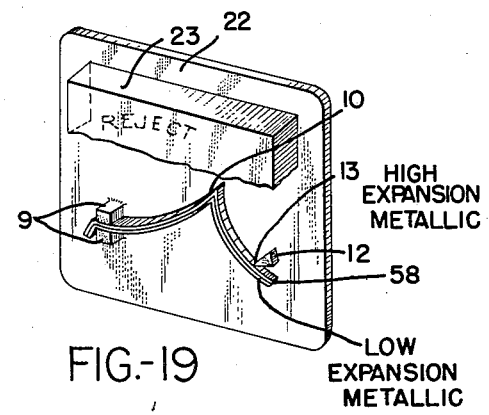
Figure 19 is a somewhat enlarged and perspective view illustrating a temperature condition indicator having a temperature sensitive element particularly adapted for sensing temperature rise as is indicated by the legends, the indicator having a longer time delay before action than in the case of the indicators of Figures 1–5, inclusive.

Referring now to Figure 19, the structure shown therein is enlarged somewhat but similar to the temperature condition indicator of Figures 1–5, inclusive, with the exception that the bimetallic has a relatively long extension 58 beyond the keeper component 12. The bimetallic 10 which forms the spring-loaded component in this instance is held by the retainer 9, as in Figures 1–5, inclusive. However, the extension 58 beyond the keeper component 12 provides that a longer time will occur before the bimetallic bends free of the keeper component 12 at the knife edge 13. As shown by the legends the structure of Figure 19 is adapted for sensing a rise in temperature.

Figure 20:
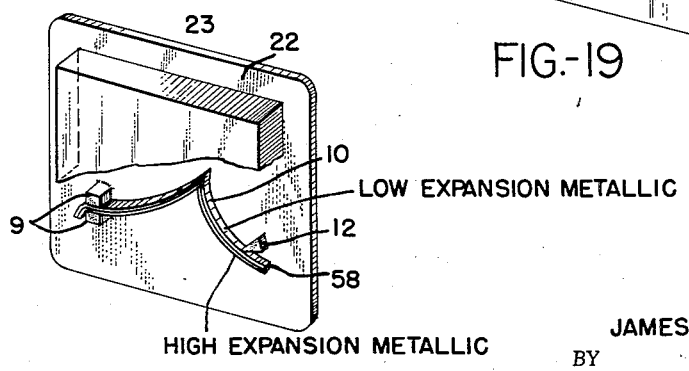
Figure 20 is a view similar to that of Figure 19 but with the indicator adapted for sensing a drop in temperature.

The structure of Figure 20 is similar to that shown in Figure 19 except for the legends, which indicate that the arrangement of the bimetallic 10 is such that the indicator will sense a drop in temperature.

Figure 21 illustrates a modified version of the temperature condition indicator in which the base 22 having the closure 23 is provided with the retainer 9. The spring-loaded component 60 in this instance is formed of spring steel, while the keeper component 61 is the bimetallic, the keeper component being secured to the base by studs 62 similar to those designated at 9. A leaf spring 63 retained by stud 64 on the base 22 tends to bias the component 60 towards the "reject" area and the free end of the component 60 is retained by the keeper component 61 in the form of the bimetallic. With temperature change in the situation where the indicator is to sense a rise in temperature the keeper component bends upwardly releasing the component 61 when the condition is attained.

In Figure 22 the base 22 has a closure 23 and the base is provided with the retainer 9a for retention of one end of a coil spring 66. The other end of the coil spring is secured to a shaft 67 and the spring carries a pointer 68. The shaft 67 is rotatably mounted in the base 22 and the pointer 68 serves as a signal flag. A bimetallic strip 69 held to the base by a stud 70 has a free end 71 which engages stop 72 secured on the shaft 67. As will be noted bending of the free end 71 of the bimetallic will occasion release of the spring 66 and the signal flag 68 will move into the upper end of the danger area, signifying the condition of the goods to which the indicator is attached.

Figure 23 designates a modification of the structure of Figure 22 in which a danger flag 74 is carried on the lower end of the stop 72 to indicate a yielding in the spring prior to actual snap-action occasioned by the complete release of the bimetallic from the stop member. The danger signal is visible through the closure 23, as is the "reject" designation, as clearly shown.

In the structure of Figure 24 the keeper component comprises a rigid elongated member 75 held by a retainer 76 and engaged with the free end 77 of a coil spring 78, which is the spring-loaded signal member and comprised of a bimetallic, the inner end being rigidly held at 79 to provide for spring release.

Figure 25 designates a modification in which the housing indicated generally at 80 has a base 81 and closure 82. In this instance the retainer 83 is provided the intermediate length of the housing and keeper components 84, 85 are provided adjacent both ends of the housing and on the base 81. The "safe" zones are indicated on the base at the extremities 86, 87, while the numeral 88 designates a "repack" or "unsafe" area. A first bimetallic portion 89 has a free end 90 thereof engaging with keeper component 85. A second bimetallic portion 91 has a free end portion 92 retained by keeper component 84. The bimetallic portions 89, 91 are set to operate at different temperature ranges. This is achieved by selection of the extent to which the free ends of the bimetallic portions pass beyond the knifelike edges of the keeper components. It may also be achieved by positioning of the keeper components relative to the free end portions to provide for different tensions. The device, of course, could be formed also with two separate bimetallics retained centrally as by the single retainer, the bimetallics themselves being selected to provide the different indications.

Referring now to Figure 26, a base 93 is provided with a cup-shaped closure 94 and the base mounting the keeper component 12 and a bimetallic strip 10, extending rearwardly from the housing formed by the base 93 and closure 94, is an aluminum probe rod 95, the forward end 96 of which is secured in the base 93 and is provided with a slot 97. The fixed end 98 of the bimetallic is fitted through the slot and rigidly held by the probe. Such an arrangement is particularly useful in connection with the sensing of the temperature of bulk materials.

It is to be noted that a wide range of bimetallics is available commercially for utilization in specific applications of the above set forth embodiments of the invention. In general it is preferable to employ the bimetallic strip in such fashion that its flat side engages the keeper component.

It is also preferred to form the signal component in such manner that it will have built-in rigidity with respect to mechanical shock, such, for example, as is demonstrated by the generally triangular shape of the reversely bent signal component; in fact, reversely bent bimetallics have, under test conditions, proved thoroughly satisfactory.

The designation of the "danger," "reject" or similar areas may be provided in a number of ways, that is, on the panel, as shown in the drawings, on the closure member, or even on separate cards or the like.

Also, the housing formed by the base and closure member may be fully transparent or of only sufficient transparency to permit visual inspection.

Any suitable adhesive may be utilized for providing the temperature condition indicator in combination with a container.

In general, also, the spring-tensioned component should not be stressed beyond its elastic limits, although since the device is intended as a one-shot indicator, it is not necessary for many purposes that the device have a long resilient life.

It will be understood that this invention is susceptible to modification in order to adapt it to different usages and conditions and accordingly, it is desired to comprehend such modifications within this invention as may fall within the scope of the appended claims.

What is claimed is:

1. A snap-action temperature condition indicator comprising a base, a retainer fixed on the base, a keeper component also fixed on the base and in closely spaced relation with the retainer, said indicator having a zone which is representative of the temperature condition to be indicated, a spring-loaded signal component releaseably retained by the keeper component, said retainer fixedly securing said spring-loaded component to the base remote from the said keeper component, one of the said components comprising a thermal-responsive bimetallic strip having a free end portion engaged with the other said component to effect the retention of the components and which free end portion flexes in one direction to effect release of the components, said retainer being positioned to influence said signal component to said zone upon release of the components.

2. A snap-action temperature condition indicator as claimed in claim 1, in which one of the said components includes a coiled spring, and the other component provides for releasable retention of the coiled spring.

3. A snap-action temperature condition indicator comprising a base, a retainer fixed on the base, a keeper component also fixed on the base and in closely spaced relation with the retainer, said indicator having a zone which is representative of the temperature condition to be indicated, a spring-loaded signal component releasably retained by the keeper component, said retainer fixedly securing said spring-loaded component to the base remote from the said keeper component, the said spring-loaded signal component comprising a thermal-responsive bimetallic strip having a free end portion engaged with the said keeper component to effect the retention of the components and which free end portion flexes in one direction to effect release of the components, said retainer being positioned to influence said signal component to said zone upon release of the components.

4. A snap-action temperature condition indicator comprising a base, a retainer fixed on the base, a keeper component also fixed on the base and in closely spaced relation with the retainer, said indicator having a zone which is representative of the temperature condition to be indicated, a spring-loaded signal component releasably retained by the keeper component, said retainer fixedly securing said spring-loaded component to the base remote from the said keeper component, the said keeper component comprising a thermal-responsive bimetallic strip having a free end portion engaged with the said signal component to effect the retention of the components and which free end portion flexes in one direction to effect release of the components, said retainer being positioned to influence said signal component to said zone upon release of the components.

5. A snap-action temperature condition indicator comprising a base, a retainer fixed on the base, a keeper component also fixed on the base and in closely spaced relation with the retainer, said indicator having a zone which is representative of the temperature condition to be indicated, a spring-loaded signal component stressed against its own spring tension and releasably retained by the keeper component, said retainer fixedly securing said spring-loaded component to the base remote from the said keeper component, the said spring-loaded signal component comprising a thermal-responsive bimetallic strip which is reversely bent centrally to provide a signal flag and having a free end portion engaged with the said keeper component to effect the retention of the components and which free end portion flexes in one direction to effect release of the components, said retainer being positioned to influence said signal component to said zone upon release of the components.

6. A snap-action temperature condition indicator comprising a base, a retainer fixed on the base, a keeper component also fixed on the base and in closely spaced relation with the retainer, said indicator having a zone which is representative of the temperature condition to be indicated, a spring-loaded signal component releasably retained by the keeper component stressed against its own spring tension and formed with a free extremity, said retainer fixedly securing said spring-loaded component to the base remote from the said keeper component, the said components being integral and comprising a thermal-responsive bimetallic strip having a free end portion bent over and engaged with the free extremity of the said spring-loaded signal component to effect the retention of the components and which free end portion of the keeper component flexes in one direction to effect release of the components, said retainer being positioned to influence said signal component to said zone upon release of the components and intermediate the ends of the bimetallic strip.

7. A snap-action temperature condition indicator comprising a base, a retainer fixed on the base, a keeper component also fixed on the base and in closely spaced relation with the retainer, said indicator having a zone which is representative of the temperature condition to be indicated, a spring-loaded signal component releasably retained by the keeper component, said retainer fixedly securing said spring-loaded component to the base remote from the said keeper component, the said keeper component comprising a thermal-responsive bimetallic strip having a bent over free end portion engaged with the said signal component to effect the retention of the components and which free end portion flexes in one direction to effect release of the components, said retainer being positioned to influence said signal component to said zone upon release of the components.

8. A snap-action temperature condition indicator comprising a base, a retainer fixed on the base, a keeper component also fixed on the base and in closely spaced relation with the retainer, said indicator having a zone which is representative of the temperature condition to be indicated, a spring-loaded signal component releasably retained by the keeper component, said retainer fixedly securing said spring-loaded component to the base remote from the said keeper component, the said spring-loaded signal component comprising a thermal-responsive bimetallic strip having a free end portion engaged with the said keeper component to effect the retention of the components and which free end portion flexes in one direction to effect release of the components, said retainer being positioned to influence said signal component to said zone upon release of the components, and said signal component having a portion extending beyond the retainer on the side of the retainer remote from the keeper component projecting rearwardly of the base and formed as a probe.

9. A snap-action temperature condition indicator comprising a base, a retainer fixed on the base and in closely spaced relation with the retainer, said indicator having a zone which is representative of the temperature condition to be indicated, a spring-loaded signal component releasably retained by the keeper component, said retainer fixedly securing said spring loaded component to the base remote from the said keeper component, the said spring-loaded signal component comprising a thermal-responsive bimetallic strip having a free end portion engaged with the said keeper component to effect the retention of the components and which free end portion flexes in one direction to effect release of the components, said retainer being positioned to influence said signal component to said zone upon release of the components, and said retainer comprising an elongated thermally conductive element which projects from the base rearwardly and has forwardly thereon means for engaging and securing the signal component.

10. A snap-action temperature condition indicator comprising a base, a retainer fixed on the base, a keeper component also fixed on the base and in closely spaced relation with the retainer, said indicator having a zone which is representative of the temperature condition to be indicated, a spring-loaded signal component releasably retained by the keeper component, said retainer fixedly securing said spring-loaded component to the base remote from the said keeper component, the said spring-loaded signal component comprising a thermal-responsive bimetallic strip which is bent centrally of its length to form a signal flag and having a free end portion engaged with the other said component to effect the retention of the components and which free end portion flexes in one directioin to effect release of the components, said retainer being positioned to influence said signal component to said zone upon release of the components, and said zone having scale graduations positioned to be traversed by the signal flag.

11. A snap-action temperature condition indicator comprising a sealed housing having a base and a closure, a retainer integral with the base fixed on the base, a keeper component fixed on the base and in closely spaced relation with the retainer, said housing having a zone which is representative of the temperature condition to be indicated, a spring-loaded signal component releasably retained by the keeper component in another zone of the housing, said retainer fixedly securing said spring-loaded component to the base remote from the said keeper component, one of the said components comprising a thermal-responsive bimetallic strip having a free end portion engaged with the other said component outside of said zone to effect the retention of the components and which free end portion flexes in one direction to effect release of the components, said retainer being positioned to influence said signal component to said zone upon release of the components.

12. A snap-action temperature condition indicator comprising a base, a retainer fixed on the base, a keeper component in the form of a sear having a knife-like edge also fixed on the base and in closely spaced relation with the retainer, said indicator having a zone which is representative of the temperature condition to be indicated, a spring-loaded signal component releasably retained by the keeper component, said retainer fixedly securing said spring-loaded component to the base remote from the said keeper component, the said spring-loaded signal component comprising a thermal-responsive bimetallic strip having a free end portion engaged with the knife-like edge of the said keeper component to effect the retention of the components and which free end portion flexes in one direction to effect release of the components, said retainer being positioned to influence said signal component to said zone upon release of the components.

13. A snap-action temperature condition indicator comprising a base, a retainer fixed on the base, a keeper component in the form of a sear having a knife-like edge also fixed on the base and in closely spaced relation with the retainer, said indicator having a zone which is representative of the temperature condition to be indicated, a spring-loaded signal component releasably retained by the keeper component, said retainer fixedly securing said spring-loaded component to the base remote from said keeper component, the said spring-loaded signal component comprising a thermal-responsive bimetallic strip having a free end portion engaged with and extending from the retainer well beyond the said knife-like edge of the keeper component to effect the retention of the components and which free end portion flexes in one direction to effect release of the components, said retainer being positioned to influence said signal component to said zone upon release of the components.

14. A snap-action temperature condition indicator comprising a sealed housing having a base and a closure, and formed with distinct zones including a visible zone, a retainer fixed on the base, a keeper component in the form of a sear also fixed on the base and in closely spaced relation with the retainer, said housing having a zone which is representative of the temperature condition to be indicated, an elongated spring-loaded signal component extending between the retainer and keeper component releasably retained by the keeper component at a free extremity of the spring-loaded signal component, said retainer fixedly securing said spring-loaded component to the base remote from the said keeper component, the said components comprising a thermal-responsive bimetallic strip having a free end portion engaged with the other said component to effect the retention of the components, and which free end portion flexes in one direction to effect release of the components, said retainer being positioned to influence said signal component to said zone upon release of the components, and to translate the movement of the free end portion into an amplified movement of the signal component.

15. A temperature condition indicator which includes a keeper component and a spring-loaded signal component releaseably retained by the keeper component, one of the said components comprising a bimetallic strip characterized by the property of differential elongation with temperature change, sensitive to the temperature condition to be indicated and having a free end portion engaged by the other component and which free end portion deflects to disengage from the said other component with attainment of the temperature condition by the strip, means fixedly supporting the bimetallic strip remote from the free end portion to provide for the deflection of the free end portion, said indicator having a zone into which the signal component extends upon release from the keeper component to indicate the occurrence of the temperature condition, and said retainer being positioned to direct said signal component to said zone.

16. In combination, in a temperature condition indicator, a keeper component and a spring-loaded signal component releaseably retained by the keeper component, said components being integral and comprising a thermal-responsive bimetallic strip having a free end portion formed as the keeper component and which free end portion flexes with temperature change and is so engaged with the spring-loaded signal component that a temperature change in one direction tends to increase the retaining force between the components and a temperature change in the other direction tends to release the spring-loaded signal component from the keeper component.

17. In combination, a container, a plurality of housings forming an elongated stack within the container, a combination in each housing of a keeper component and a spring-loaded signal component retained by the keeper component against movement in one direction, one of the components being a bimetallic and thermal-responsive to release the other component in a direction opposite to the said one direction, and a length of a retainer extending through the container and housings in releasable engagement with the thermal-responsive component on the side of said thermal-responsive component in the direction in which said thermal-responsive component tends to move to effect release of the other said component thereby retaining the thermal-responsive member against movement, one end of said retainer being secured to the container and the other end projecting from the container to provide a grip for removal of the retainer.

18. In combination, in a storage and shipping arrangement for temperature condition indicators, a container and a plurality of said indicators in side by side relation, said indicators each having a housing and a temperature sensitive device sealed within the housing, each said temperature sensitive device including a keeper component and a spring-loaded signal component releaseably retained by the keeper component, one of said components comprising a thermal-responsive strip which flexes in one direction to effect release of the components, a length of a substantially inelastic element extending through aligned openings of each of the housings engaging the thermal-responsive strip in each housing on the side of said thermal-responsive strip in the direction in which said thermal-responsive strip flexes to effect release of the components to thereby prevent movement of the said strips, and detachable means securing the length of said element to the container whereby the element may be withdrawn.

References Cited in the file of this patent

UNITED STATES PATENTS

| | | |
|---|---|---|
| 2,293,276 | Brown | Aug. 18, 1942 |
| 2,326,771 | Edison | Aug. 17, 1943 |
| 2,426,077 | Bak | Aug. 19, 1947 |
| 2,866,338 | Muncheryan | Dec. 30, 1958 |